United States Patent [19]

Meek et al.

[11] 3,775,202

[45] Nov. 27, 1973

[54] ETCHING CONTROL SYSTEM

[75] Inventors: James L. Meek, Phoenix; Enrico L. Vieane, Mesa, both of Ariz.

[73] Assignee: DEA Products, Inc., Tempe, Ariz.

[22] Filed: Mar. 13, 1972

[21] Appl. No.: 233,947

[52] U.S. Cl. .......... 156/19, 156/3, 156/8, 156/14, 156/345

[51] Int. Cl. .......... C23b 3/00, C23f 1/02

[58] Field of Search .......... 156/3, 8, 14, 19, 156/345; 252/79.1

[56] References Cited

UNITED STATES PATENTS

| | | | |
|---|---|---|---|
| 3,526,560 | 9/1970 | Thomas | 156/19 X |
| 3,705,061 | 12/1972 | King | 156/19 |

*Primary Examiner*—William A. Powell

*Attorney*—Morris Kirschstein et al.

[57] ABSTRACT

In an etching system utilizing ferric chloride solution or equivalent spray directed onto copper work pieces to be etched, the etchant in the etcher sump is circulated through a chlorinator under control of an etching control monitor. This introduces gaseous chlorine and effectively maintains the etching potential of the ferric ($Fe^{+3}$) ions present in the solution. As copper accumulates in the etchant, a part is removed, ammonium chloride is added, and this mixture is then cooled. A crystallized double salt containing copper is separated, and the solution, thus reduced in copper content, is stored for subsequent reintroduction to the etching system.

10 Claims, 1 Drawing Figure

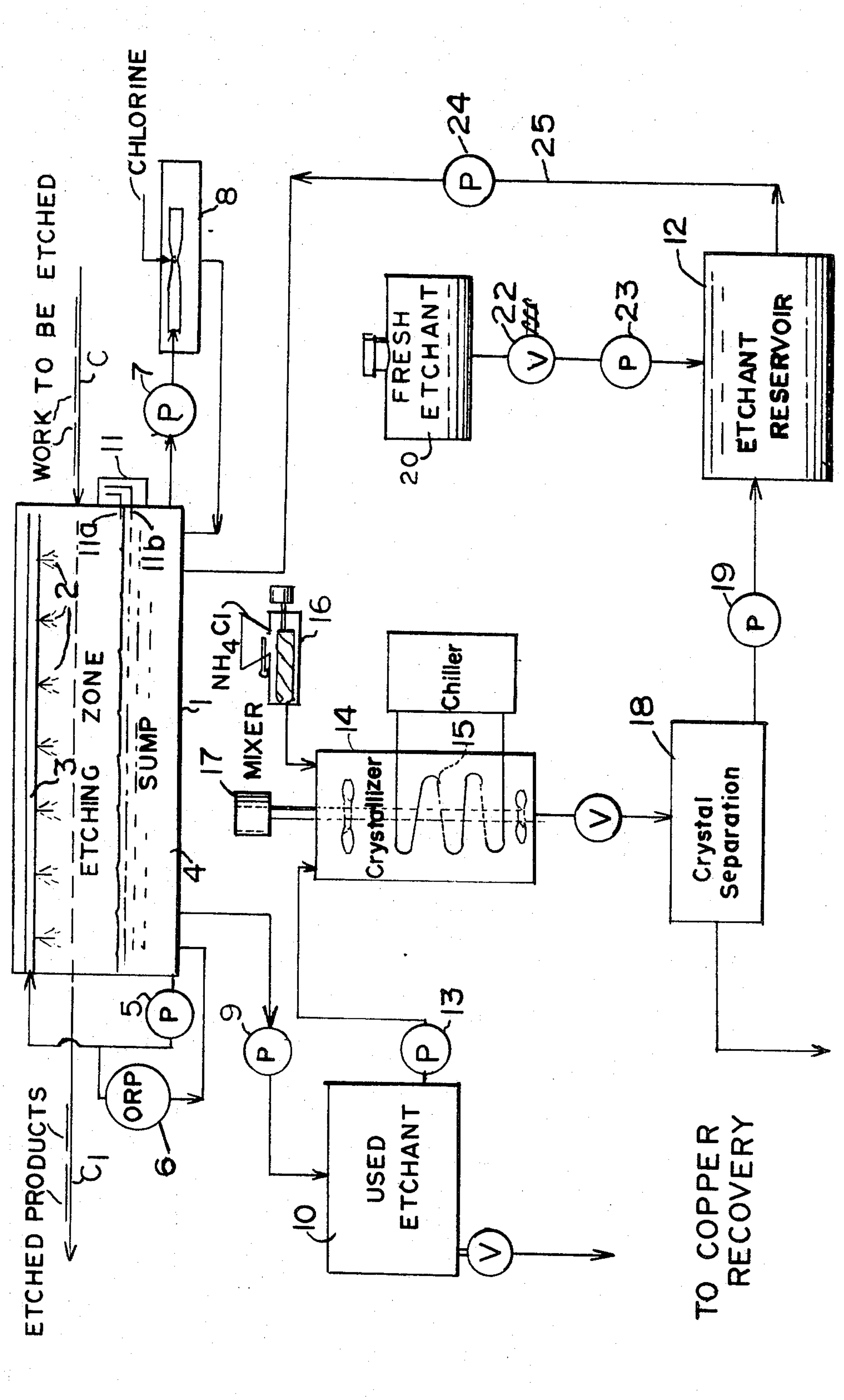
WORK TO BE ETCHED
CHLORINE
ETCHED PRODUCTS
ETCHING ZONE
SUMP
ORP
USED ETCHANT
MIXER
$NH_4Cl$
Crystallizer
Chiller
Crystal Separation
FRESH ETCHANT
ETCHANT RESERVOIR
TO COPPER RECOVERY

ETCHING CONTROL SYSTEM

BACKGROUND AND PRIOR ART

The manufacture of etched copper electric circuitry devices is a well developed art. However, difficulties exist in prior art attempts to produce printed circuit boards efficiently by etching processes.

Copper work pieces such as plates or sheets to be etched, e.g., printing plates or plates for electronic circuitry, are conventionally fed through an etching chamber where surfaces are subjected to a spray of heated ferric chloride solution. These solutions exhibit excellent etching characteristics. However, etching the copper work results in reduction of ferric ($Fe^{+3}$) ions to ferrous ($Fe^{+2}$) ions which, unlike ferric ($Fe^{+3}$) ions, do not etch. As the etching proceeds, the ferrous ($Fe^{+2}$) ion concentration increases and ferric ($Fe^{+3}$) ion concentration decreases in proportion to the amount of copper etched. The net effect is a drop in etching rate and efficiency as increased amounts of copper are etched. The continuous increase in copper content thus also contributes to the overall reduction of etching speed of the ferric chloride solution.

In prior art etching procedures, using ferric chloride solutions as commonly practiced, it is necessary to change the etchant solution at rather frequent intervals. Although the theoretical maximum copper capacity of etchant is in excess of 16 oz./gal., a practical state of exhaustion is reached when copper concentration reaches about 8–10 oz. per gallon. Higher copper content requires exposing the surfaces of the work to the etchant for progressively longer periods of time as the etching rate decreases rapidly. This requires frequent adjustment of the etchant equipment. Where etching production rate requirements are high, it is common practice to change the etchant more frequently and at lower copper concentrations, for example 4 oz. of copper per gallon of etchant. Even at these lower copper content levels, adjustments must still be made with respect to exposure times to the etchant.

The present invention pertains to improving control of the etching fluid by essentially continuous treatment thereof to regenerate or renew it. More specifically, it relates to an etching process or system wherein the etchant is regenerated or replaced substantially continuously and the etched copper is removed either continuously or very frequently in small increments.

It is one object of the present invention to maintain continuously an effective and economical copper etching system, preferably employing ferric chloride solutions, by substantially continuous replacement or regeneration of the ferric ($Fe^{+3}$) ions. This is accomplished by controlled injection of chlorine gas into the solution, as needed, to maintain the effectiveness and allow for the subsequent reuse of the etching solution.

Another object of the invention is to remove the copper introduced into the etchant at substantially the same rate it is introduced, thus holding the copper concentration at a reasonably constant level. This removal preferably is accomplished by formation of a crystalline double salt with ammonium chloride, but it can also be done in other ways.

It is a further object of the invention to maintain the copper content in the etching solution within narrow limits so that this solution may be used without interruption, concurrently with the frequent or continuous injection of chlorine gas into a recycled part of the etching solution. The etchant is cycled through a chlorinator in a manner to maintain narrowly varying concentration limits of ferric ($Fe^{+3}$) ions within the etching bath. The copper content in the etching solution is maintained within narrow limits by removal of a portion of the etching solution containing copper and replacement with an equal portion which contains substantially less copper. This removal of etchant and replacement with solution is stoichiometrically controlled by the amount of copper introduced into the solution.

These and other objects of the present invention will become apparent to those skilled in the art as the description proceeds.

DESCRIPTION OF PREFERRED EMBODIMENT

The invention may be described by reference to the accompanying single FIGURE of drawing in which is shown diagrammatically a continuous copper etching system. Certain features shown in the drawing may be modified or omitted in some cases, as will be explained hereinafter.

Referring to the drawing, the work pieces to be etched, such as plates or sheets to form printed wiring boards, for electric or electronic circuitry, are transported into and out of the etching tank 1 by any convenient means, such as a conveyor, C, C¹. A printed circuit board of this type characteristically comprises an insulating substrate, which may be flexible or rigid, upon which a layer of metallic copper is deposited or laminated on one or both sides. Well known processes, such as photoresist methods, will effectively shroud or coat those portions of the copper surface which are not to be etched. Uncoated portions are etched through by the etchant liquid which is sprayed on the work. In some work, such as in etching printing plates, the etching does not extend all the way through the copper. As the work to be etched passes through the etching chamber 1, it is subjected to a continuous spray of etchant which, as shown in the drawing, is accomplished by spray nozzles or openings to produce patterns emanating from the etchant supply line 3.

The etching chamber 1 includes a sump 4 which contains the etchant to be pumped by the pump 5 to the supply line 3. The etchant chosen for the present system is a ferric chloride solution in water. However, as indicated in the drawing, after the system has been in operation for a time, the etchant will actually include ferrous ions ($Fe^{+2}$), ferric ($Fe^{+3}$) ions, cupric ($Cu^{+2}$) ions, chloride ($Cl^{-1}$) ions and water. Copper from the etched surface loses electrons and reduces some of the ferric ions to ferrous ions. The etchant is maintained at a preselected and controlled temperature which is dependent to some extent on the materials from which the system is constructed as well as on the etching characteristics desired. Polyvinyl chloride is presently a preferred construction material for the tank and operating temperatures should be safe for the material used. Temperatures of the general range of 120° to 130° F are preferred for polyvinyl chloride and similar materials. Temperatures of this range may be used in this description. Other construction materials may allow higher operating temperatures, up to the 180 ° – 200° F range, for example. For most types of etching, however, the 120° – 130° F range is sufficient and satisfactory.

When the ferric chloride etching solution is sprayed, preferably forcibly to keep the surface clean and enhance the etch characteristics, it strikes the copper work pieces; the ferric ($Fe^{+3}$) ions react with the copper and are reduced to form ferrous ($Fe^{+2}$) ions and cuprous ($Cu^{+1}$) ions are produced by exchanging one electron, as follows:

$$Fe^{+3} + Cu^0 \rightarrow Fe^{+2} + Cu^{+1}$$

As a cuprous ($Cu^{+1}$) ion dissolves into solution, it immediately reacts with another ferric ($Fe^{+3}$) ion to form another ferrous ($Fe^{+2}$) ion and a cupric ($Cu^{+2}$) ion by taking an electron from the ferric ($Fe^{+3}$) ion as follows:

$$Fe^{+3} + Cu^{+1} \rightarrow Fe^{+2} + Cu^{+2}$$

For the sake of simplicity, however, the two reactions may be represented by one overall equation:

$$2Fe^{+3} + Cu^0 \rightarrow 2Fe^{+2} + Cu^{+2}$$

As the etching proceeds, the ferrous ($Fe^{+2}$) ion concentration obviously increases and the ferric ($Fe^{+3}$) ion concentration decreases. This change results in a lessening of the oxidation potential of the etching solution. This reduction in potential can be and is used in the present invention to monitor and eventually control the etching strength of the etchant solution. By placing Oxidation-Reduction Potential probes of known type in the piping system which supplies etchant to the supply line 3, a continuous sampling of the proportionate ferric ($Fe^{+3}$) to ferrous ($Fe^{+2}$) ion concentration ratio can be made. These ORP probes may be an inert, noble metal electrode coupled with the standard Calomel or Silver-Silver Chloride reference electrode. Alternatively, a direct indicating electrode system may be used. The latter is comprised of a platinum electrode immersed in a supply of standard fresh etchant which is separated by a porous membrane from another platinum electrode submersed in the etchant to be measured. The specific form of the ORP probe is not a feature of the present invention.

Electronic monitoring equipment is attached to the probes. This is not shown in the drawing, but is calibrated and preset to control a pump 7 which pumps etchant from sump 4 in Tank 1, whenever the oxidation potential drops to a predetermined level. This pump 7 forces the etchant liquid through a chlorinator device 8 and back into the sump. Flow of chlorine is actuated by flow of etchant through the venturi.

The chlorine flow rate, when it is turned on, is set as high or slightly higher than the maximum stoichiometric rate of copper addition to the etching bath. Thus, chlorine flows in fast enough to replace ferric ions at least as rapidly as they are formed at the maximum expected etching rate. At lower etching rates, the chlorine feed is intermittent, at such intervals and for such flow periods as are required to maintain the predetermined and desired oxidation potential.

As the etchant passes through the chlorinator, which in this case is in the form of a venturi, chlorine gas is drawn into the etchant solution. Chlorine obviously can be introduced in other ways. This chlorine gas reacts with ferrous ($Fe^{+2}$) ions which are present in the etching solution to reform the ferric ($Fe^{+3}$) ions and to form chloride ($Cl^{-1}$) ions as follows:

$$2Fe^{+2} + Cl_2 \rightarrow 2Fe^{+3} + 2Cl^{-1}$$

This process effectively regenerates the etching solution and maintains it at the present oxidation potential. As chlorination proceeds, the ferric ($Fe^{+3}$) ion concentration increases and the ferrous ($Fe^{+2}$) ion concentration drops. The chlorination of the etching solution, however, is not allowed to proceed to complete conversion of all ferrous ($Fe^{+2}$) ions to ferric ($Fe^{+3}$) ions, since some of the chlorine gas will have a tendency to escape from the etching solution without reaction and with objectionable corrosion and other effects as the process of regeneration nears completion.

During the process of etching, therefore, the ORP monitoring equipment will turn the pump 7 on and off, as required, to maintain the ferric ($Fe^{+3}$) to ferrous ($Fe^{+2}$) ion concentration within preset limits at all times.

Meanwhile, as the etching proceeds, the copper concentration in the etching solution will also rise. Since the ferrous ($Fe^{+2}$) ions generated by etching are in direct proportion to the amount of copper etched and since the amount of chlorine required to regenerate the ferrous ($Fe^{+2}$) ions to ferric ($Fe^{+3}$) is stoichiometrically proportional to the concentration of ferrous ($Fe^{+2}$) ions formed, the cumulative amount of chlorine that is required to maintain the oxidation potential over a particular time period can be used as a measure of how much copper has been introduced into the etchant during the same time period. This cumulative chlorine addition is used in this invention to control copper content of the solution.

Therefore, the flow rate at which chlorine gas enters the chlorination venturi device 8 is preset via a calibrated flow meter, as explained above. An accumulative elapsed timer, not shown in the drawing, is placed in the electrical system to measure and add up the duration of the chlorination cycles. After a preset total elapsed time of chlorine flow, at the predetermined rate which at least equals or preferably slightly exceeds the ferric ion reduction rate, calculated stoichiometrically, which of course, corresponds to a predetermined increase in copper concentration of the etching solution, the pump 9 is turned on by the timer-controlled electric control holding circuit, not shown. Etching solution from the sump is then pumped into a spent etchant tank 10.

As the etchant is pumped from sump 4 in the manner just described, the etchant level in tank 1 will fall. At a calibrated level, a low level probe **11*b* in the level probe assembly 11 will be exposed. The level probes 11 collectively may be electrical conductivity devices or other suitable level indicators of good accuracy. Float devices could possibly be used, but they tend to be less accurate. The probes 11*a* and 11*b* are wired into a logic circuit or other suitable control mechanism which controls the periodic filling and draining of the etcher sump 4 between preset limits. When the low level probe 11*b* is exposed, pump 9 will be turned off and a refilling pump 24 will be turned on. Pump 24 is arranged to pump regenerated etchant from a tank 12 which preferably contains regenerated etchant but may contain new or fresh etchant. This brings the regenerated or fresh liquid into the etcher pump 4. When liquid level in sump 4 reaches the high level probe 11*a*, the pump 24 is turned off. This probe operates always to turn on pump 24 and maintain normal liquid level, replacing etchant which is lost by dragout, except that this high level control is overridden when pump 9 is actuated. The etchant in tank 12** preferably is used etchant which has had the copper removed from it by steps which will be described below. The removal of a known quantity of etchant from the etcher sump 4 and the replacement with fresh or regenerated etchant lowers the overall copper concentration in the active etchant within tank 4 to a desired and predetermined low level. However, since copper is thus removed in small increments, the etchant is at all times maintained at essentially constant copper content and hence at essentially constant etching potential.

The concentration of copper in the etching solution in the sump 4 thus is controlled within predetermined limits which may be as narrow as desired. The small fluctuations in copper concentration are chosen in advance so as to have a substantially negligible effect on the etching speed of the etching solution. This is accomplished by a combination of essentially constant controlled oxidation potential, introducing chlorine as required, and by coordinated withdrawal of copper from the system as determined quantitatively by the added chlorine.

The copper in the etching solution which is to be removed is preferably treated as follows: Assume that fairly wide copper limits of 6 to 8 ounces per gallon are acceptable. Etching solution in the spent etchant tank 10 containing not less than 6 or more than 8 oz. of copper per gallon of liquid is pumped by a pump 13 into a crystallizer 14. The latter is essentially a cooling or chilling device which also agitates the liquid salt mixture during chilling. Concurrently, a metered amount of ammonium chloride, corresponding to about 1.68 lb. $NH_4Cl$ per lb. of copper contained in the spent solution is introduced by a dry chemical feeder 16. The mixture of salt and liquid in the crystallizer 14 is agitated by a mixer 17 driven by a suitable power source, and is cooled by a cooling or refrigerating coil or equivalent system 15° to about 50° F. Complex salt crystals of copper chloride and ammonium chloride which are formed by reaction with the copper salt (cupric chloride) are fed into the crystal separation equipment 18 shown below the crystallizer. This crystal separation equipment 18 can employ continuous filtration or simple decantation, or some other known and suitable technique as is understood in the art. The solution remaining after separation of the crystals is very low in copper content. It is returned by a pump 19 into a regenerated etchant storage tank 12 to await subsequent reintroduction, as needed, into the etcher.

Since it is impossible to avoid some carry-out of etching solution by the plates or other work which is being etched, as successive pieces of work pass through the etcher, or to stop inclusion of some of the etching solution in and on the separated crystals, it is necessary either periodically or constantly to introduce a small amount of fresh etchant into the system. This can be taken from a fresh etchant supply tank 20 under control of a solenoid operated valve 22 and a pump 23. If desired, the fresh etchant can be fed directly into line 25 from pump 24 by passing the Tank 12, going directly into Tank 1. As shown, the fresh liquid is fed first into the regenerated etchant reserve Tank 12.

As suggested above, it may be preferred in some cases to simply store the spent etchant and not attempt to regenerate it as part of the continuous etching process. In this case, the process operates by discarding etchant in small batches, as determined by the spacing between level probes **11*a* and 11*b*, and replacing each discarded batch with enough fresh solution to restore the level in the sump. This includes, of course, adding enough etchant to compensate for that carried out by the etched work pieces, in addition to that discarded through pump 9**, under control of the level probes.

In all cases, the operation of pump 9 is initiated by the timer, which integrates or accumulates, in effect, the amount of chlorine which has been added during a replacement cycle. The timer, in effect, communicates the fact that a given quantity of chlorine has been added, in response to a call or series of calls from the oxidation-reduction probe 6. A stoichiometrically equivalent amount of copper is withdrawn by lowering the sump level and replacing with liquid of substantially lower copper content, preferably 0 to about 0.5 ounce per gallon.

EXAMPLE 1

An etching sump was filled with 36° Baume' ferric chloride solution which was maintained at a temperature of 120° F. The high level probe (**11*a*) was set to maintain the solution volume in the tank 1 at 18 gallons. Copper articles to be etched were introduced into the etching solution and the copper concentration, after a period of operation, was allowed to increase to 8 oz./gal. As the copper was thus introduced into the etchant, the ORP monitoring equipment 6,** using two platinum probes with fresh $FeCl_3$ solution as reference, was turned on. Chlorine was introduced on demand to maintain the etchant oxidation potential between about 50 mv. and 60 mv. below that of the fresh ferric chloride solution used as a reference.

When the copper concentration reached 8 oz. per gallon of etchant, as determined by chlorine addition (flow rate multiplied by time of flow), the fill-drain logic circuits were turned on automatically. The etching solution in tank 1 at this time was 7 ¼ inches deep. The high level probe had been set at 7 ¼ inches from the bottom of the sump and the low level probe was set at 6.8 inches. The fill-drain sequence was tripped by the cumulative chorine flow timer. Etchant was pumped from the sump by pump 9 until the liquid surface reached the 6.8 inches level and exposed the low level probe **11*b*. Uncovering this probe interrupted its conductive circuit which caused drain pump 9 to be turned off and fill pump 24 to be turned on. Regenerated etchant from tank 12 was then pumped back into the etcher sump through line 25** until the liquid again reached the upper level of 7 ¼ inches. Etchant had been removed to the extent of 1.1 gallons and replaced with regenerated etchant solution containing essentially no copper. This resulted in the copper concentration in the sump dropping from 8.0 to 7.5 oz./gal. Thus, about 8.8 oz. of copper were removed from the sump for this fill-drain cycle. Such cycling is typical but obviously can be varied as desired.

The chlorination flow rate in the above example was 100 lbs. of chlorine per 24 hours, or 0.069 pounds per minute of continuous chlorine flow. The elapsed timer mentioned above was set for a cycle of 8.8 minutes. Ordinarily, chlorination starts and stops one or more times in such a cycle, as called for by the ORP probes 6. Every 8.8 minutes of total chlorination (chlorine flow) time, the fill-drain sequence for pumps 9 and 24 was triggered. The copper concentration of the etching solution in the etcher sump thus alternated in each cycle between about 8.0 oz./gal. and 7.5 oz./gal.

Fifteen gallons of spent etchant was accumulated in the tank 10 and then pumped in one batch, along with 12.8 lbs. of granular ammonium chloride, to the crystallizer 14. The temperature in the crystallizer was dropped to 50° F by chilled ethylene glycol solution circulated through corrosion resistant titanium coils from the cooling system 15. Complex salts precipitated at this temperature and the resulting slurry of crystals, suspended in the solution, was filtered through the crystal separating equipment which contained two polypropylene filter cartridges. The filtered ferric chloride solution, after the crystals were separated, was returned to the regenerated etchant tank 12. The retained crystals of complex salt, $CuCl_2 \cdot 2NH_4Cl \cdot 2H_2O$ composition, were removed from the filter elements by backflushing with about 7 gallons of warm water. This dissolved the byproduct crystals for subsequent treatment to recover the copper, which is not part of this invention.

EXAMPLE 2

The etcher sump and level probe system as described in Example 1 were employed with alternative equipment to give another set of operating parameters, as well as another implementation of the processing sequence herein described. The oxidation potential of the etchant was sensed by a commercial ORP controller, using a standard reference electrode and a platinum oxidation potential electrode. The instrument was first standardized at 600 mv. with a fresh 36° Baume' ferric chloride solution. The on and off control points were selected at 540 mv. and 570 mv., respectively.

The volume of each fill-drain exchange of etchant was 2.1 gallons with a total etcher volume in the sump at the upper level of 18 gallons. The copper content was allowed to build up to 8.5 oz./gal. The chlorination rate was 150 lbs. per 24-hour day or 0.104 lb./min. The elapsed timer was set for cumulative chlorination cycles between level reduction and replenishment operations of 11.6 minutes. The copper content of the etcher was thus cycled between a minimum of about 7.6 oz./gal. and a maximum of about 8.5 oz./gal., as the regenerated etchant in this case was found to contain about 0.2 oz./gal. copper content.

The spent etchant from tank 10 at 95° F was pumped by pump 13 at a constant rate of 0.478 gal./min. into a mixing tank of 5.3 gallons capacity which was placed in the line ahead of the chiller in the crystallizer. Hence, the inventory of liquid in tank 10 varied. Ammonium chloride was fed at a constant rate of 0.353 lb./min. into this mixing tank. The mixture of spent etchant and ammonium chloride was continuously discharged into the crystallizer where it was chilled to 50° F by refrigerated glycol circulating through titanium coils as in Example 1. The resulting crystal slurry was filtered in a continuous vacuum filter on a sintered polypropylene filter medium. A vacuum of 5 inches of mercury was applied to the filter. This was sufficient to filter at a liquid rate of 0.33 gallon per square foot of filter area per minute. Solid byproduct crystals were obtained. These were assayed at 21.2 percent copper by weight and 1.45 percent iron by weight. The salt was removed from the filter by a rotating knife at a rate of 55 lb./hr. The liquid, after filtering, was returned to the regenerated etchant tank 12.

The performance of the regenerated etchant in its basic task was very satisfactory. Fresh ferric chloride solution at 36° Baume' density and at 120° F temperature will etch through copper foil approximately 0.0014 inches thick (1 oz./ft.$^2$) in 60 seconds. The regenerated etchant processed in Examples 1 and 2 showed no significant decrease in etching rate as the copper content of the etchant increased and dropped between the designated limits. The average time for etching the copper sheets, after the solution reached the equilibrium copper content described above was approximately 80 seconds to etch through the same 1 oz./ft.$^2$ copper foil. The undercut factor obtained was approximately 1 : 4. A qualitative evaluation of the etched piece parts showed relatively fine grained and clean cut edges. In addition, the low free acid content of the etchant allowed some copper parts which had oxide pretreatments (which are easily undercut in acidic etchants) to be etched cleanly.

During continuous etching, work pieces are carried through the tank at a predetermined rate. The spray pump continuously passes a side stream of the etchant in the etching zone over the oxidation potential sensor while etching is going on. The ORP sensor 6 calls upon pump 7 to remove a stream for chlorination, to restore oxidation potential, as needed. Chlorination may be continuous but is usually intermittent because chlorine flows preferably a little faster than required to maintain the oxidation potential required. After a predetermined quantity of chlorine is added, the timer actuates the drain pump 9 to draw off a second stream. This second stream is pumped to spent etchant storage. From there it is regenerated by, firstly, adding ammonium chloride to form a complex salt with the cupric chloride which has accumulated from the etching operation. Secondly, this solution is chilled to a temperature considerably below its working temperature, preferably around 50° F or lower, from a working temperature normally at least 100° F or more. Preferred working temperature usually is at least 120° F; preferred cooling temperature, to precipitate the complex salt in crystal form, is about 50° F.

Thirdly, the complex salt crystals are moved from the spent and treated liquid. This may be done by filtration, centrifuging, or in ay suitable manner. The thus regenerated liquid, now substantially free of copper, is passed to storage, where it remains until needed to keep up the inventory of the etchant in the etching zone. As noted above, the regeneration step is preferable but not always necessary. Fresh etchant is always supplied to replace that carried out of the system by entrainment on work pieces or crystals. It may also be used to replace all that is taken out by pump 9.

In the prior art, as in Jones U.S. Pat. Nos. 2,886,420 and 3,083,129, for example, it has been suggested that copper chloride per se can be removed from spent etching solutions, after the spent etchant is chlorinated, by simple chilling. In the present regenerative system, the solution is never allowed to really become "spent" and etching efficiency is maintained continuously. Also, the relative solubilities of ferric chloride, which must be retained in the liquid, and of copper chloride, which is to be removed, are not such as particularly to favor simple separation of copper chloride in this manner. Addition of ammonium chloride to form the complex salt is preferred. It has been noted by others, e.g., Mellor, "Treatise on Applied and Theoretical Chemistry," that the complex copper-ammonium salts are less soluble than copper chloride. No prior art of which applicants are aware has suggested a process by which the solution is kept active by the separate but interrelated and coordinated control of both chlorine and copper content, using oxidation potential to trigger chlorine additon and using the cumulative chlorine addition to control and limit the copper content.

To replace "dragout," i.e., etchant liquid carried out of the system by the wet copper articles and by entrainment on or in the separated salt crystals, a fresh supply of etchant is maintained in the tank 20 and is fed out as required. Solenoid control valve 22 and/or the pump 23 may be controlled from level sensing means of any suitable type, such as probes 11 or a float or equivalent either in the regenerated etchant tank 12 or in the tank 1, to maintain liquid inventory in the system at the desired level. The automatic means by which this is done will be obvious to those skilled in the art. Copper content preferably is maintained between about 6 ounces and 9 ounces per gallon in the working solution, more preferably between about 7 and 8.5. The regenerated solution in tank 1 is not allowed to become spent but is kept active and efficient, so as to be capable of etching through a uniform copper film of one ounce per square foot thickness in a suitable predetermined time.

To summarize briefly: The etchant in the etching zone is continuously maintained at a high and substantially uniform level of efficiency. This is accomplished by a combination of chlorination of a side stream, on the one hand, coordinated with withdrawal of a second stream to reduce the overall copper content and keep it within an acceptable working range. Chlorination is accomplished by feeding gaseous chlorine at a preset rate to regenerate the ferrous ions in the side stream to ferric ions and occurs whenever the oxidation potential device calls for chlorination. The second stream is withdrawn at the end of each chlorination timed cycle, i.e., when a predetermined quantity of chlorine, measured by rate of flow and time of flow, has been introduced. The amount of liquid withdrawn in the second stream for each timed cycle is that which will, stoichiometrically, in terms of removed copper, balance the chlorine introduced during the cycle.

The withdrawn liquid is replaced, plus enough to replace other losses, by regenerated etchant, fresh etchant, or a combination of both.

It will be obvious that the process may be varied and that various items of the equipment shown and described may be changed or substituted, without departing from the spirit and purpose of the invention.

What is claimed is:

1. A process for etching copper with continuing and substantially uniform efficiency as the primary etching agent, which comprises the following steps, in combination:

a. maintaining a predetermined minimum volumetric supply of etchant solution in an etching zone to carry out the etching operation which tends to convert ferric ions to ferrous and to increase the copper content of said solution;

b. continuously sensing the oxidation potential of said etchant solution supply;

c. under control of said sensing, chlorinating a withdrawn side stream of the etching solution to reconvert the ferrous ions to ferric ions, and cumulatively measuring the chlorine used in this chlorination during a predetermined time cycle;

d. utilizing the amount of chlorine introduced to control withdrawal of a second stream of used etchant from the etching zone, thereby to remove copper from the system in substantially stoichiometric proportions with respect to the chlorine added during step (c), thereby holding the copper content of said solution in the etching zone within acceptable limits for said continuing and substantially uniform etching efficiency.

2. Process according to claim 1 in which a sufficient amount of etching solution of lower copper content than that in the etching zone is added periodically to maintain the volumetric supply in the etching zone and to keep the copper content of liquid in said zone between about 6 and 9 ounces of copper per gallon of liquid.

3. Process according to claim 1 in which the withdrawn used etchant is regenerated for reuse by removing at least a substantial part of its copper content and regenerated etchant is used, in part at least, to replace that withdrawn.

4. Process according to claim 3 in which copper content in the liquid in the etching zone is maintained at a level between about 7 and 9 ounces per gallon of liquid.

5. Process according to claim 1 in which the chlorine addition rate is set at least high enough to balance stoichiometrically related maximum rate of copper addition to the etching bath due to the etching operation.

6. Process according to claim 1 wherein fresh etchant of substantially no copper content is introduced periodically and automatically to replace liquid lost from the bath and to maintain a predetermined volumetric liquid level in said etching zone.

7. Process according to claim 1 wherein the second stream of withdrawn liquid is reacted with ammonium chloride to form a readily separable complex cuprammonium salt.

8. Process according to claim 7 in which the liquid containig the salt complex is chilled substantially below its working temperature to precipitate said salt and thereby regenerate said liquid.

9. Process according to claim 1 in which a concentrated ferric chloride solution as initial and efficient etchant liquid is maintained at a temperature in the etching zone of about 120° to 130° F and wherein the solution is regenerated when the copper level in said solution reaches about 8 to 9 ounces per gallon, and thereafter withdrawing part of solution and replacing it with solution having a copper content of 0 to about 0.5 ounces per gallon.

10. Process according to claim 9 in which chlorine is metered substantially continuously to maintain a substantially constant ferric ion content in the etching liquid.

* * * * *